(12) United States Patent
Kung (10) Patent No.: US 11,181,723 B2
(45) Date of Patent: Nov. 23, 2021

(54) REFLECTIVE WIDE-ANGLE LENS

(71) Applicant: Fujian Ruichi Intelligent Technology Research Institute Co. Ltd, Fujian (CN)

(72) Inventor: Chienping Kung, Fujian (CN)

(73) Assignee: Fujian Richi Intelligent Technology Research Institute Co. Ltd., Fujian (CN)

( * ) Notice: Subject to any disclaimer, the term of this patent is extended or adjusted under 35 U.S.C. 154(b) by 214 days.

(21) Appl. No.: 16/483,521

(22) PCT Filed: Jun. 22, 2018

(86) PCT No.: PCT/IB2018/054612
§ 371 (c)(1),
(2) Date: Aug. 5, 2019

(87) PCT Pub. No.: WO2019/053522
PCT Pub. Date: Mar. 21, 2019

(65) Prior Publication Data
US 2020/0012083 A1 Jan. 9, 2020

(30) Foreign Application Priority Data
Sep. 13, 2017 (TW) ................. 106213600

(51) Int. Cl.
*G02B 13/16* (2006.01)
*G02B 13/06* (2006.01)
*G02B 17/08* (2006.01)

(52) U.S. Cl.
CPC ............. *G02B 13/16* (2013.01); *G02B 13/06* (2013.01); *G02B 17/0816* (2013.01)

(58) Field of Classification Search
CPC .... G02B 13/16; G02B 13/06; G02B 17/0816; G02B 13/18; G02B 17/08; G02B 13/0045;
(Continued)

(56) References Cited

U.S. PATENT DOCUMENTS 10,928,612 B1 * 2/2021 Chen ................. G03B 21/28
2009/0116124 A1 * 5/2009 Minefuji ............. G02B 17/08
359/727

(Continued)

FOREIGN PATENT DOCUMENTS

CN 102967923 A 3/2013
CN 106125265 A 11/2016
(Continued)

OTHER PUBLICATIONS

International Search Report and Written Opinion with English Translation of ISR, cited in PCT/IB2018/054612 dated Oct. 25, 2018, 10 pages.

*Primary Examiner* — Robert E. Tallman
(74) *Attorney, Agent, or Firm* — Cooper Legal Group, LLC (57) ABSTRACT

The present invention provides a reflective wide-angle lens having a large aperture (for example, FNO 1.7) and a small projection ratio (for example, TR≤0.2). The reflective wide-angle lens reduces lens size and reduces the number of lenses required while achieving a clear focus on a wide range of screen sizes. The reflective wide-angle lens comprises a front lens group and a rear lens group. The front lens group comprises a first lens group and two second lens group. The rear lens group comprises a curved mirror. The first lens group comprises at least a triple cemented lens, an aspherical lens, and two spherical lenses. The second lens group comprises at least two aspherical lenses and two (Continued)

spherical lenses. The curved mirror is a concave optical symmetric aspheric mirror.

6 Claims, 8 Drawing Sheets

(58) Field of Classification Search
CPC ... G02B 13/006; G02B 13/0065; G03B 21/28
See application file for complete search history.

(56) References Cited

U.S. PATENT DOCUMENTS

| | | |
|---|---|---|
| 2010/0208364 A1 | 8/2010 | Minefuji |
| 2010/0232039 A1 | 9/2010 | Chen et al. |
| 2014/0049813 A1* | 2/2014 | Hsu ................. G02B 17/08 |
| | | 359/364 |
| 2015/0185452 A1* | 7/2015 | Hsu ................. G02B 9/64 |
| | | 359/728 |
| 2016/0363746 A1* | 12/2016 | Minefuji ............. G03B 21/005 |

FOREIGN PATENT DOCUMENTS

| | | |
|---|---|---|
| JP | 2015125293 A | 7/2015 |
| JP | 2016151687 A | 8/2016 |
| JP | 2017009779 A | 1/2017 |
| TW | 201144855 A | 12/2011 |
| TW | 554571 U | 1/2018 |

* cited by examiner

| Projection ratio=0.19 | |
|---|---|
| Projection distance(mm) | screen (inch) |
| 345.5 | 83 |
| 368.0 | 88.41 |
| 408.0 | 98.5 |
| 449.0 | 108.8 |
| 454.0 | 110 |

REFLECTIVE WIDE-ANGLE LENS

TECHNICAL FIELD

The present invention relates to a wide-angle lens using a curved mirror, in particular to an ultra-short-focus reflective projection lens for projection.

RELATED ART

With the advancement of the key components of the projector, the resolution of the display component has reached 4K/2K, and the brightness of the light source, whether it is LED or laser, is greatly increased, making the projection products more mature in the home market.

Short-focus projection can greatly shorten the distance between the projector and the screen, and often only a few tens of centimeters of projection distance can be used to project images of hundreds of inches. The short-focus projector can be placed on the TV cabinet, which is the same position as the general TV set. Therefore, compared with the general telephoto projector, the short-focus projector is more space-saving and has the advantages of installation. Therefore, the short-focus projector is more practical than general projectors.

In recent years, short-focus projection technology has gradually become the focus of the market, and the current short-focus projection ratio is between 0.24 and 0.65, but it is still technically difficult to achieve an ultra-short-focus lens with a projection ratio of less than 0.2. In addition, in the case of using a large aperture projection lens to increase the brightness, in order to achieve a smaller projection ratio, the lens light must have a larger angle of incidence on the screen, resulting in more spherical aberration, coma, astigmatism and distortion of the projected image. Conventionally, it is often necessary to use more lenses to eliminate these undesirable phenomena. In addition, when assembling ultra-short-focus lenses, it is still necessary to fine tune some of the lenses to obtain clear images, which results in a complicated manufacturing process and is disadvantageous for mass production.

In this context, this creation is produced.

SUMMARY OF THE INVENTION

In view of this, according to an embodiment of the present invention, a reflective wide-angle lens having a large aperture and a small projection ratio is provided, the reflective wide-angle lens is used for projecting light from a display element, the reflective wide-angle lens comprising: a front lens group, which is disposed on an optical axis, and the front lens group comprises: a first lens group for receiving light from the display element, the first lens group having a first focal length; a second lens group for receiving light from the first lens group; and a rear lens group comprising a curved mirror for reflecting light passing from the display element through the first lens group and the second lens group, the curved mirror having a second focal length, the absolute value of the ratio of the second focal length to the first focal length is greater than 0.7 and less than 1.3. Wherein the distance from the apex of the lens of the first lens group closest to the display element along the optical axis to the apex of the lens of the second lens group furthest from the display element is defined as a total length of the front lens group, the distance from the apex of the lens of the first lens group closest to the display element to the center point of the curved mirror in the direction of the optical axis is defined as a total lens length, and the ratio of the total lens length to the total length of the front lens group is greater than 1.8 and less than 2.2.

In another preferred embodiment, the front lens group has the same optical axis as the rear lens group. In another preferred embodiment, the first lens group comprises at least a triple cemented lens, an aspherical lens, and two spherical lenses. In another preferred embodiment, the triple cemented lens comprises a second external lens and a central lens, the two external lenses are negative refraction and the central lens is positive refraction. In another preferred embodiment, the second lens group comprises at least two aspherical lenses and two spherical lenses.

In another preferred embodiment, the second lens group comprises at least two aspherical lenses and a double cemented lens. In another preferred embodiment, the curved mirror is a concave optical symmetric aspheric mirror. In another preferred embodiment, the second lens group is moved back and forth to adjust the focus of the reflective wide-angle lens.

BRIEF DESCRIPTION OF THE DRAWINGS

Other aspects of the present invention will be more apparent from the following detailed description of the accompanying drawings.

The described embodiments and their advantages are best understood by reference to the following detailed description of the accompanying drawings.

The drawings are not intended to limit the form and details of the embodiments described herein without departing from the scope of the embodiments.

SYMBOL DESCRIPTION

100 reflective wide-angle lens, 101 front lens group, 103 rear lens group

105 mirror, 107 optical axis, 110 first lens group

111 aspherical lens, 113 spherical lens, 115 triple cemented lens

117 spherical lens, 120 second lens group, 121 aspherical lens

123 double cemented lens, 125 aspherical lens, S1~S18 mirror surface

C display component, C1 prism, F1~F8 sampling position.

DETAILED DESCRIPTION OF THE EMBODIMENTS

To provide a thorough understanding of the present invention, many specific details will be presented in the following description.

The disclosed embodiments may be practiced without some or all of the specific details. Well-known operations and principles are not described in detail in order not to unnecessarily obscure the disclosed embodiments. When the disclosed embodiments are described in conjunction with specific examples, it is understood that the present invention is not intended to be limited. When specific embodiments are described by relative descriptors (e.g., "left" and "right", or "upper" and "lower", etc.), these terms are used for ease of understanding and are not intended to be limiting.

The present invention provides an ultra-short-focus reflective wide-angle lens that has advantages that it is suiTABLE for large aperture (FNO1.7) use, has fewer lenses, shorter lens lengths, and has no need for detailed lens adjustment when manufacturing lenses, also it has simple assembly and is fitting to mass manufacturing demand, the projection ratio thereof reaches 0.2, and the projection size range have a large scaling ratio. Various embodiments of the present invention will be described below with the accompanying drawings.

Figure 1:
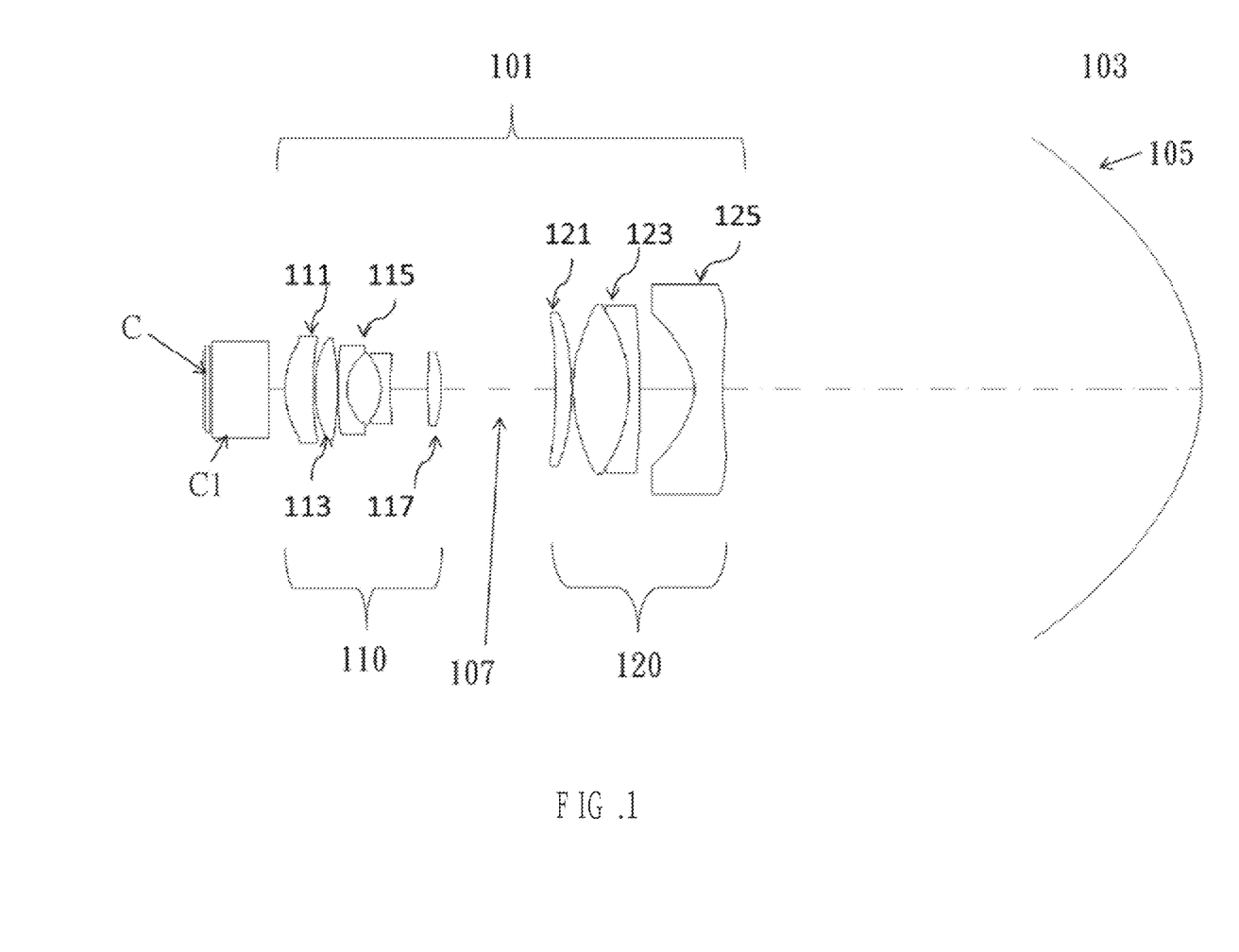
FIG. 1 is a schematic diagram of a reflective wide-angle lens according to an embodiment of the present invention.

In accordance with an embodiment of the present invention, FIG. 1 shows a schematic diagram of an exemplary reflective wide-angle lens 100. The reflective wide-angle lens 100 may be a tele-centric wide angle lens applied to a projection display device having a high resolution, a large aperture (for example, FNO 1.7), and a low projection ratio (for example, a projection ratio of 0.19). Referring now to FIG. 1, the reflective wide-angle lens 100 is shown. The reflective wide-angle lens 100 comprises a front lens group 101 and a rear lens group 103. The front lens group 101 is disposed on the optical axis 107 and comprises a first lens group 110 and a second lens group 120. The reflective wide-angle lens 100 is used to project light from the display element C. After the light from the display element C passes through the prism C1, the first lens group 110 and the second lens group 120, the light is projected onto a screen (not shown) via the concave aspheric mirror 105 for viewing. The display element C can be a display element used in an optical system of a projection display device, such as a cathode ray tube (CRT), a liquid crystal display (LCD), a digital micromirror device (DMD), or a liquid crystal on silicon (Light source modulation components such as LCoS, Liquid Crystal on Silicon. In the embodiment of FIG. 1, the display element C is disposed with prism C1, but it should be understood that in other embodiments the display element C may or may not be disposed with a prism depending on the needs of the projection display device.

The first lens group 110 is configured to receive light from the display element C and has a first focal length. The first lens group 110 comprises an aspherical lens 111, a spherical lens 113, a triplet lens 115 and a spherical lens 117. In addition, the triplet lens 115 comprises two outer lenses and a center lens, wherein the two outer lenses are negative refraction, and the center lens is positive refraction. The main function of the first lens group 110 is to improve the lens resolution and reduce the optical axial and lateral chromatic aberration. The use of the three cemented lenses can reduce the number of lenses used and shorten the lens size.

The second lens group 120 is configured to receive light from the first lens group. The second lens group 120 comprises an aspherical lens 121, a double cemented lens 123, and an aspherical lens 125. In some embodiments, the double cemented lens 123 can also be a dual spherical lens. The main function of the second lens group 120 is to eliminate the coma and astigmatism generated by the light during the transmission, reduce the distortion, increase the angle of the field of view, and move back and forth with different projection sizes to adjust the focal length of the reflective wide-angle lens so as to make the image clearly focused.

The distance from the apex of the lens closest to the display element of the first lens group 110 along the optical axis 107 to the apex of the lens of the second lens group 120 farthest from the display element is defined as the total length of the front lens group.

The rear lens group 103 comprises a curved mirror 105 (for example, a concave optical symmetric aspheric mirror) for reflecting light passing through the first lens group and the second lens group from the display element and correcting the distortion aberration caused by the first lens group 110 and the second lens group 120. The curved mirror 105 has a second focal length. The distance from the apex of the first lens group 110 closest to the lens of the display element to the center point of the curved mirror 105 in the direction of the optical axis 107 is defined as the total lens length. The reflective wide-angle lens according to the present invention can simultaneously satisfy the following conditional expressions:

$$0.7 < |\text{second focal length/first focal length}| < 1.3 \quad (I)$$

$$1.8 < \text{total lens length/total length of the front lens group} < 2.2 \quad (II)$$

It should be noted that although FIG. 1 shows that the rear lens group 103 is disposed on the same optical axis as the lens front group 101, in other embodiments, the lens rear group 103 can also be offset upwards or downwards relative to the optical axis, and/or deflected at an angle, in which case only if the first lens group 110 is closest to the lens apex of the display element to the center point of the curved mirror 105 and the distance in the optical axis direction remains unchanged (in other words, the total lens length does not change).

The lens lens arrangement of the present invention can shorten the size of the wide-angle lens and reduce the number of lenses used in the lens, and can achieve clear focusing from a small projection screen size to a large projection screen size, and has a large aperture (for example, FNO 1.7) and a very small projection ratio (for example, a projection ratio≤0.2).

Figure 2:
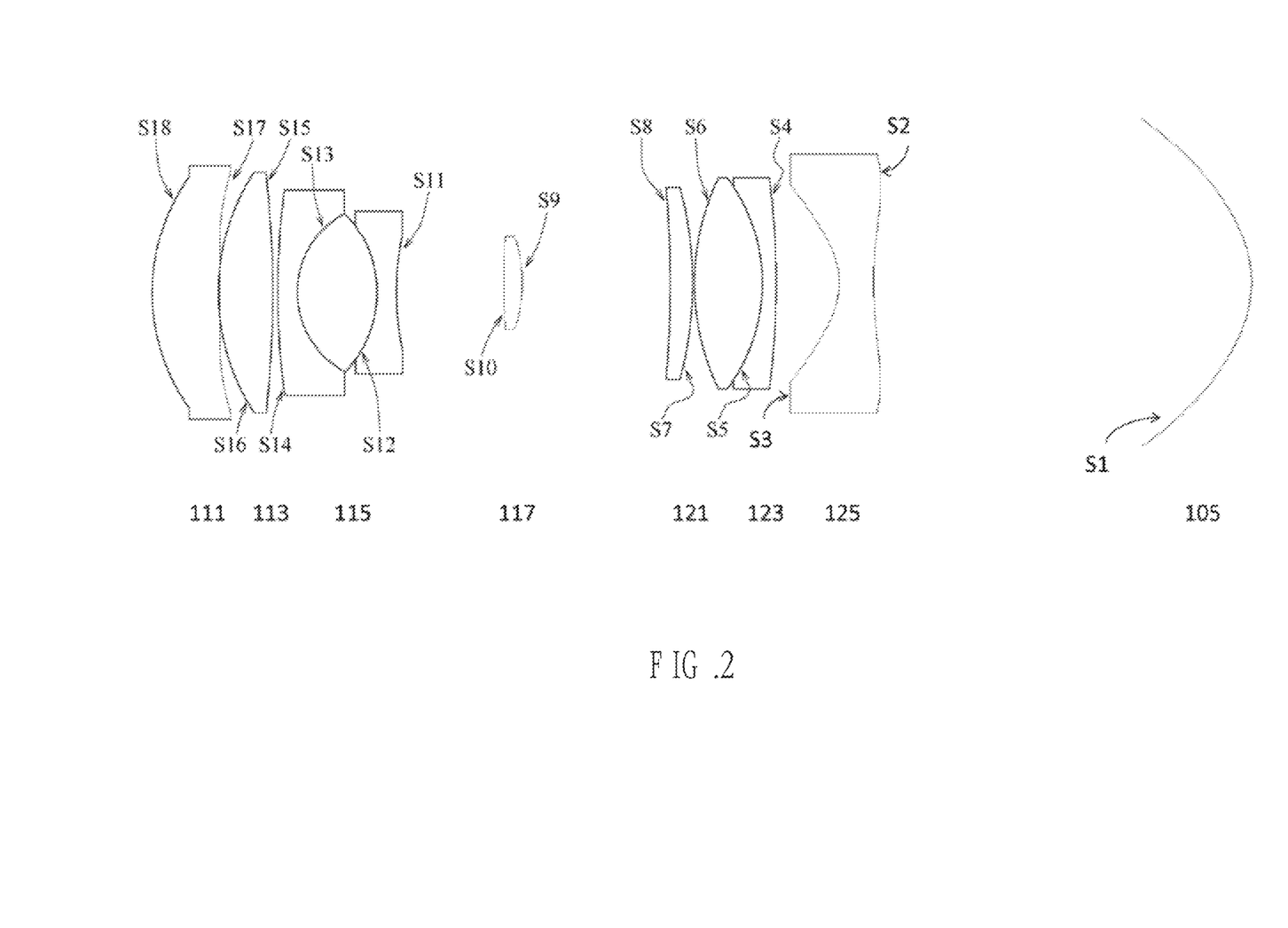
FIG. 2 is a detailed diagram of the front lens group and the rear lens group of the reflective wide-angle lens.

Referring to FIG. 2, it should be understood that the purpose of FIG. 2 is merely exemplary and is not intended to illustrate the relative position or proportions of the lenses. The mirrors in each lens are labeled in FIG. 2 for illustration. As shown in FIG. 2, the curved mirror 105 comprises a mirror surface S1. In the second lens group 120, the aspherical lens 125 comprises a mirror surface S2 and a mirror surface S3, the double cemented lens 123 comprises a mirror surface S4, a mirror surface S5 and a mirror surface S6, and the aspherical lens 121 comprises a mirror surface S7 and a mirror surface S8. In the first lens group 110, the spherical lens 117 comprises a mirror surface S9 and mirror surface S10, the triple cemented lens 115 comprises a mirror surface S11, a mirror surface S12, a mirror surface S13, and a mirror surface S14. The spherical lens 113 comprises a mirror surface S15 and a mirror surface S16, and the aspherical lens 111 comprises a mirror surface S17 and a mirror surface S18. Exemplary parameters of the preferred embodiment of the reflective wide-angle lens 100 will be described below in a TABLE. It should be noted that the thickness refers to the distance from the intersection of the mirror surface/screen to the optical axis to the next mirror surface (in other words, the thickness indicated is the thickness of the lens or the distance between the mirror and the next mirror). For example, the thickness of the screen field is the distance from the screen to the mirror surface S1, the thickness of the mirror surface S1 field is the distance from the mirror surface S1 to the mirror surface S2, and the thickness of the mirror surface S2 field is the mirror surface S2 to the mirror surface S3 (in other words, the thickness of the lens 125). It should be understood that because the dimensions described herein can be scaled up and down, the units are not labeled. In addition, the one marked with an asterisk indicates that it is movable when adjusting the focus.

TABLE 1

| Mirror surface | Radius of curvature | Thickness | Reflective mirror | Lens parameters (refractive index.Abbe) |
|---|---|---|---|---|
| Screen | Unlimited | 449.021649* | | |
| S1 | −49.2 | −110* | reflective lens | |
| S2 | 142.31 | −6.278 | | 525.565 |
| S3 | −14.85 | −11.38 | | |
| S4 | −154.6 | −205 | | 846.237 |
| S5 | −30.65 | −12.28 | | 654.398 |
| S6 | 44.344 | −0.4 | | |
| S7 | −85.95 | −3.995 | | 585.3 |
| S8 | −470 | −26.833* | | |
| S9 | −26.85 | −3.262 | | 761.265 |
| S10 | 128.56 | −9.427 | | |
| S11 | 31.136 | −2 | | 805.255 |
| S12 | −11.64 | −8.034 | | 618.634 |
| S13 | 9.0904 | −2 | | 762.265 |
| S14 | 74.155 | −0.494 | | |
| S15 | −111.1 | −5.498 | | 805.255 |
| S16 | 22.338 | 0.1284 | | |
| S17 | −427.4 | −6.845 | | 583.595 |
| S18 | 19.468 | | | |

The following TABLEs 2 to 4 detail the parameters of the aspherical mirror surfaces S1, S2, S3, S7~S8, and S17~S18, where K is a conic constant and AR is an aspheric coefficient. In addition, TABLE 5 shows the thickness of the air gap between each other when adjusting the focus.

TABLE 2

| mirror surface | |
|---|---|
| S1 | K: −1.4931E+00 AR1: −5.1909E−03 AR2: −1.8804E−03<br>AR3: −9.5638E−06 AR4: 4.8482E−07 AR5: −7.1698E−10<br>AR6: −2.0724E−10 AR7: −2.2154E−13 AR8: −4.8756E−14<br>AR9: −1.0092E−17 AR10: 4.0387E−17 AR11: 5.9148E−21<br>AR12: −1.6989E−23 AR13: 2.1201E−24 AR14: −4.9561E−24<br>AR15: 3.5035E−28 AR16: 6.5474E−28 AR17: 8.3812E−32<br>AR18: 2.1957E−31 AR19: −2.2656E−35 AR20: −4.2904E−35<br>AR21: −1.3332E−38 AR22: −2.5345E−40 AR23: −4.4518E−42<br>AR24: −7.1328E−44 AR25: −9.5582E−46 AR26: −8.7108E−48<br>AR27: −2.2166E−37 AR28: −3.2869E−39 AR29: 1.9156E−40 |
| S2 | K: 1.8696E+01 AR1: −6.8682E−03 AR2: 8.5046E−03<br>AR3: −5.1566E−04 AR4: 2.7521E−06 AR5: 9.3295E−07<br>AR6: −7.1388E−08 AR7: −9.4582E−11 AR8: 2.2777E−10<br>AR9: −1.3898E−12 AR10: −8.5403E−13 AR11: −7.7560E−16<br>AR12: 2.0839E−15 AR13: 2.7014E−18 AR14: −2.0395E−18<br>AR15: 5.6887E−21 AR16: 1.5722E−22 AR17: −1.5983E−26<br>AR18: −3.7469E−24 AR19: −1.1013E−26 AR20: 9.3002E−27<br>AR21: 1.5503E−29 AR22: 8.3474E−32 AR23: −2.5224E−32<br>AR24: −2.4668E−33 AR25: −1.3235E−34 AR26: −5.3233E−36<br>AR27: −2.2166E−37 AR28: −3.2869E−39 AR29: 1.9156E−40<br>AR30: 2.0830E−41 |

TABLE 3

| mirror surface | |
|---|---|
| S3 | K: −1.9427E+00 AR1: −3.4702E−03 AR2: −4.6541E−04<br>AR3: −4.3994E−04 AR4: 3.3725E−05 AR5: 5.7448E−07<br>AR6: −1.8726E−07 AR7: 2.6132E−09 AR8: 2.1786E−09<br>AR9: −4.9035E−12 AR10: −2.0245E−11 AR11: −2.6413E−14<br>AR12: 9.5873E−14 AR13: −1.2351E−17 AR14: −1.9931E−16<br>AR15: 1.6646E−19 AR16: 2.0274E−20 AR17: 6.0601E−22<br>AR18: 3.7762E−22 AR19: 8.3521E−25 AR20: 8.4194E−26<br>AR21: −1.5881E−27 AR22: −1.9356E−28 AR23: −1.3504E−29<br>AR24: −7.5651E−31 AR25: −3.6872E−32 AR26: −1.5321E−33<br>AR27: −5.9020E−35 AR28: −2.7463E−37 AR29: 1.6361E−37<br>AR30: 1.8304E−38 |

TABLE 4

| mirror surface | |
|---|---|
| S7 | K: 0.687122<br>A: −.152395E−04 B: 0.661396E−07 C: −.619365E−10<br>D: −.190811E−12 |
| S8 | K: −90.000000<br>A: −.178425E−04 B: 0.678306E−07 C: −.880812E−10<br>D: −.186814E−12 |
| S17 | K: −69.000000<br>A: 0.724142E−04 B: −.473579E−07 C: 0.753054E−09<br>D: −.785791E−11 |
| S18 | K: −6.694240<br>A: 0.113676E−03 B: −.635555E−06 C: 0.348107E−08<br>D: −.111848E−10 |

TABLE 5

| Thickness S0 | 449.02165 408.55099 368.42385 |
|---|---|
| Thickness S1 | −110.00000 −110.18834 −110.41555 |
| Thickness S8 | −26.83300 −26.64466 −26.41745 |

By taking the parameters of the above TABLE into the following formula, the coordinate parameters of the mirrors are obtained (the origin position is defined at the apex of the lens). It should be noted that in the following formula, CURV is the reciprocal of the above curvature radius (in other words, 1/RDY), 135 RADIUS is the radius of curvature of the lens, and A, B, C, and D are aspherical coefficients. For the mirror surfaces S1~S3, the aspheric surface is calculated as:

$$X = (Y/NRADIUS)$$

$$Z = \left(\frac{(CURV)Y^2}{1 + (1 - (1+K)(CURV)^2 Y^2)^{1/2}}\right) + (AR1)^X + (AR2)^{X2} + \ldots + (AR30)^{X30}$$

For mirror surfaces S7~S8 and S17~18, the aspheric constant is:

$$Z = \left(\frac{(CURV)Y^2}{1 + (1 - (1+K)(CURV)^2 Y^2)^{1/2}}\right) + (A)Y^4 + (B)Y^6 + (C)Y^8 + (D)Y^{10}$$

According to the reflective wide-angle lens of the above preferred embodiment, the absolute value of the ratio of the second focal length to the first focal length is about 0.98, and the ratio of the total lens length to the total length of the front lens group is about 2.09, which meets the above two condition formulas.

Although the parameters of a preferred embodiment are detailed above, it is to be understood that the above-described parameters are merely illustrative and not limiting, and those skilled in the art can do so without departing from the spirit and scope of the present invention. The parameters are modified while still satisfying the two conditional expressions described in the disclosure.

Figure 3A:
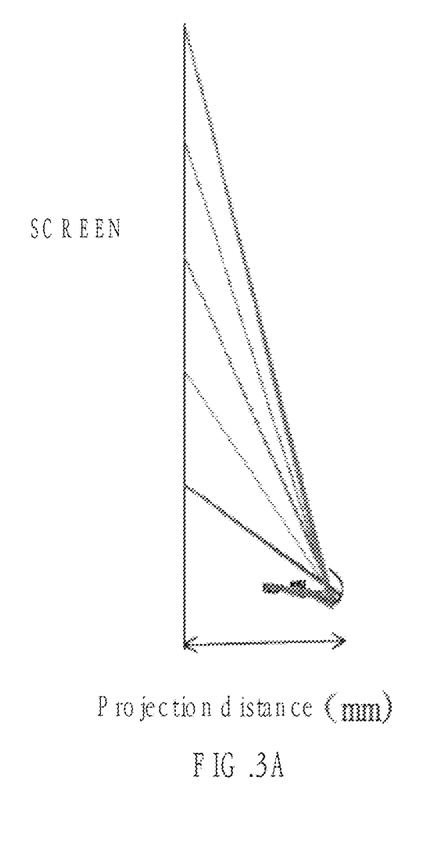
FIGS. 3A and 3B illustrate the screen size of the wide-angle lens when it is projected at different projection positions.
Figure 3B:
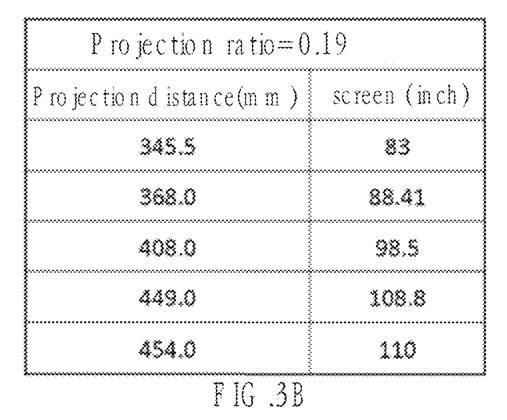
Figure 3C:
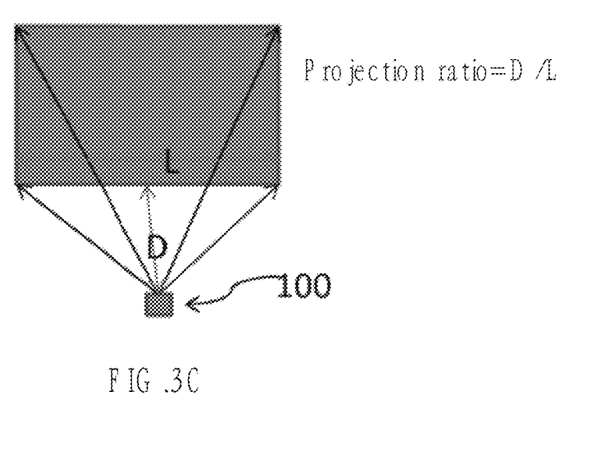
FIG. 3C is a schematic diagram of the projection ratio.

FIGS. 3A and 3B illustrate the screen size of the wide-angle lens 100 of the present invention when projected at different projection positions. FIG. 3C is a schematic diagram showing the projection ratio, which is the ratio of the distance D from the front end of the projection lens to the projection screen to the wide side L of the projected image (in other words, D/L), and the projection wide angle lens according to the present invention can achieve a projection ratio of 0.19.

Figure 4A:
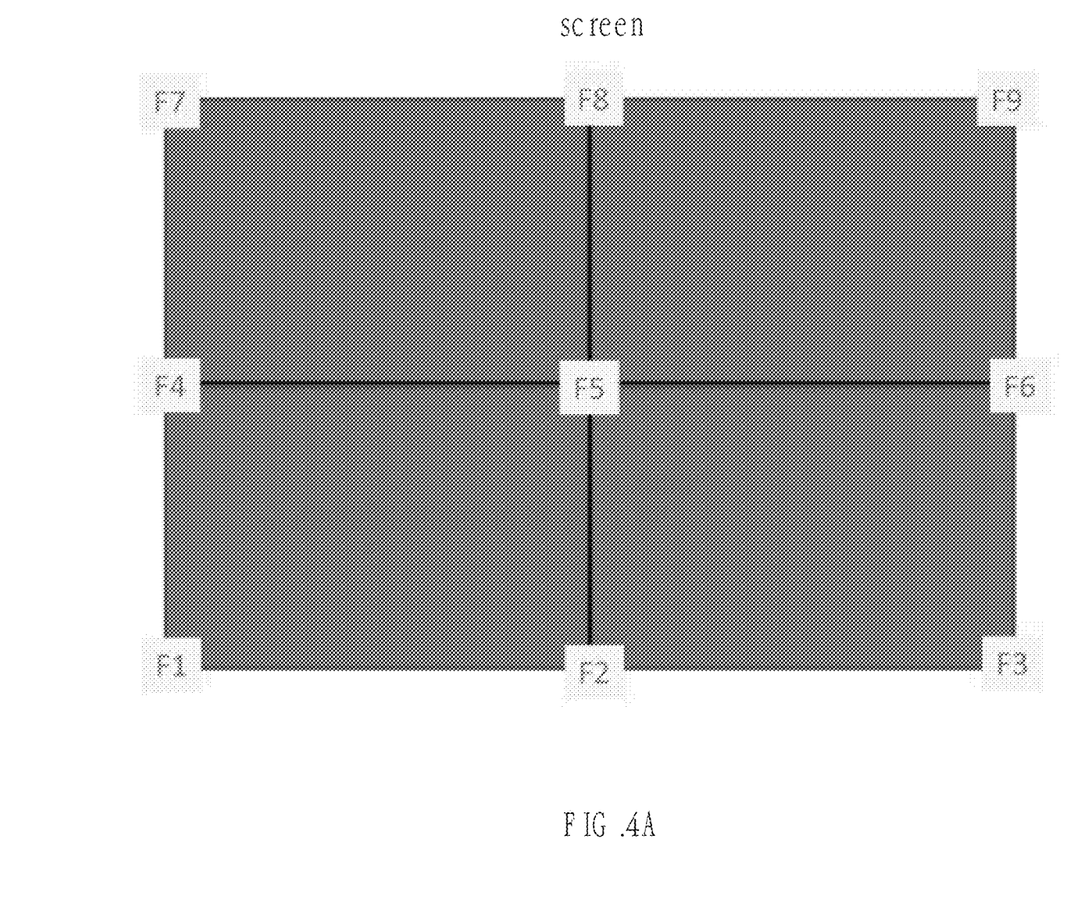
FIG. 4A depicts different sampling points on the projection screen.
Figure 4B:
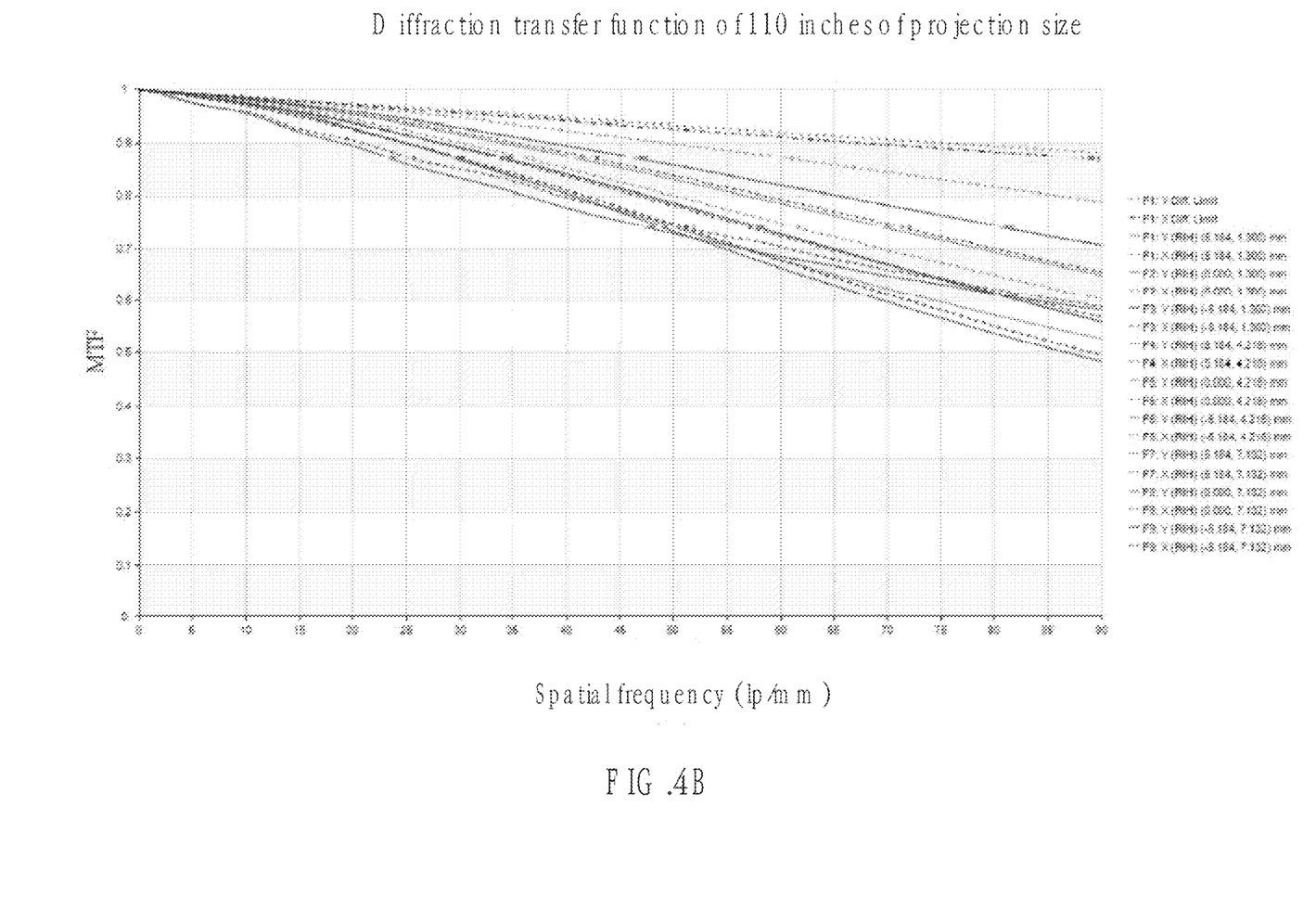
FIGS. 4B~4D respectively illustrate the modulation transfer function of the reflective wide-angle lens used for different projection sizes.
Figure 4C:
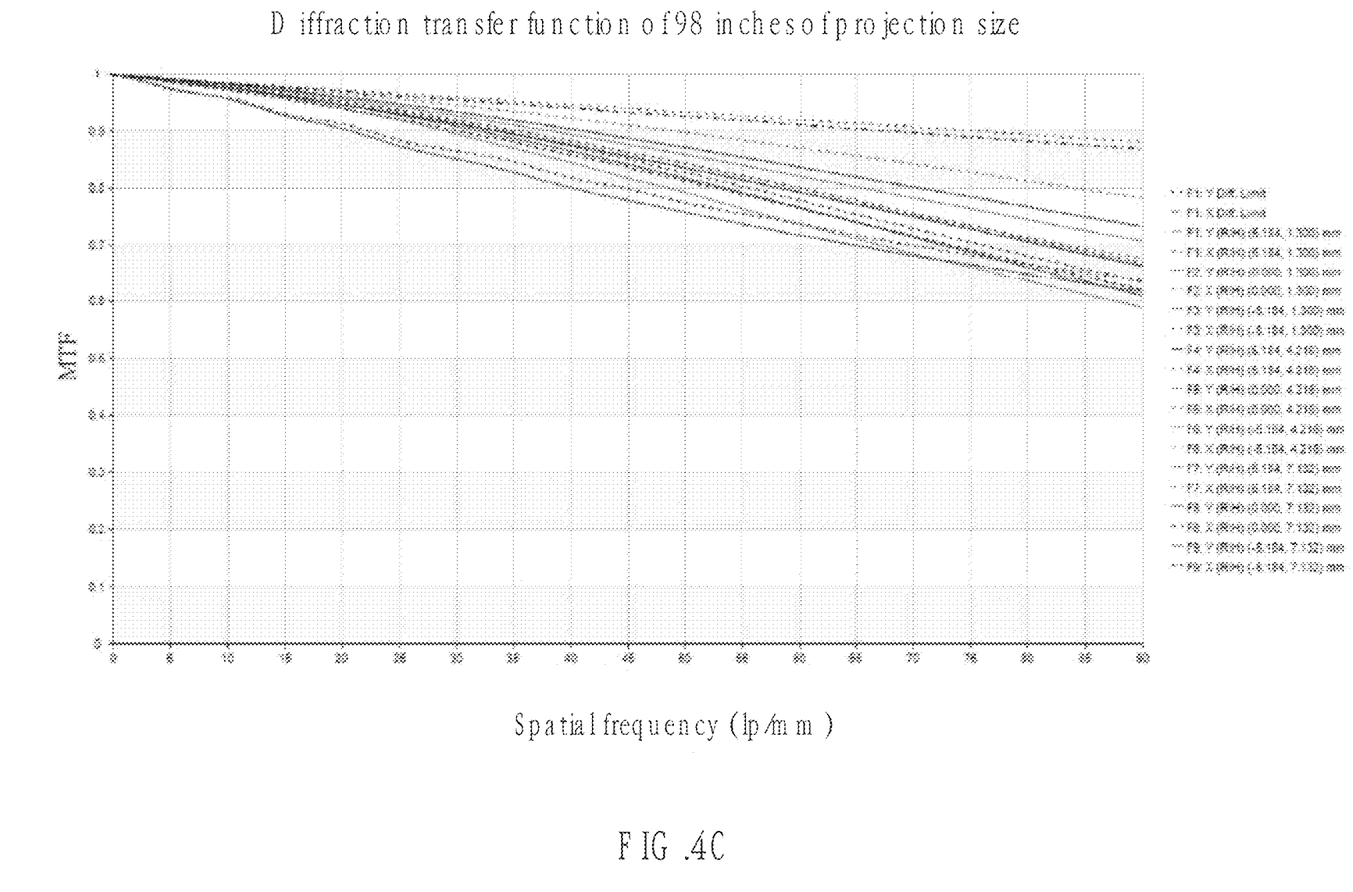
Figure 4D:
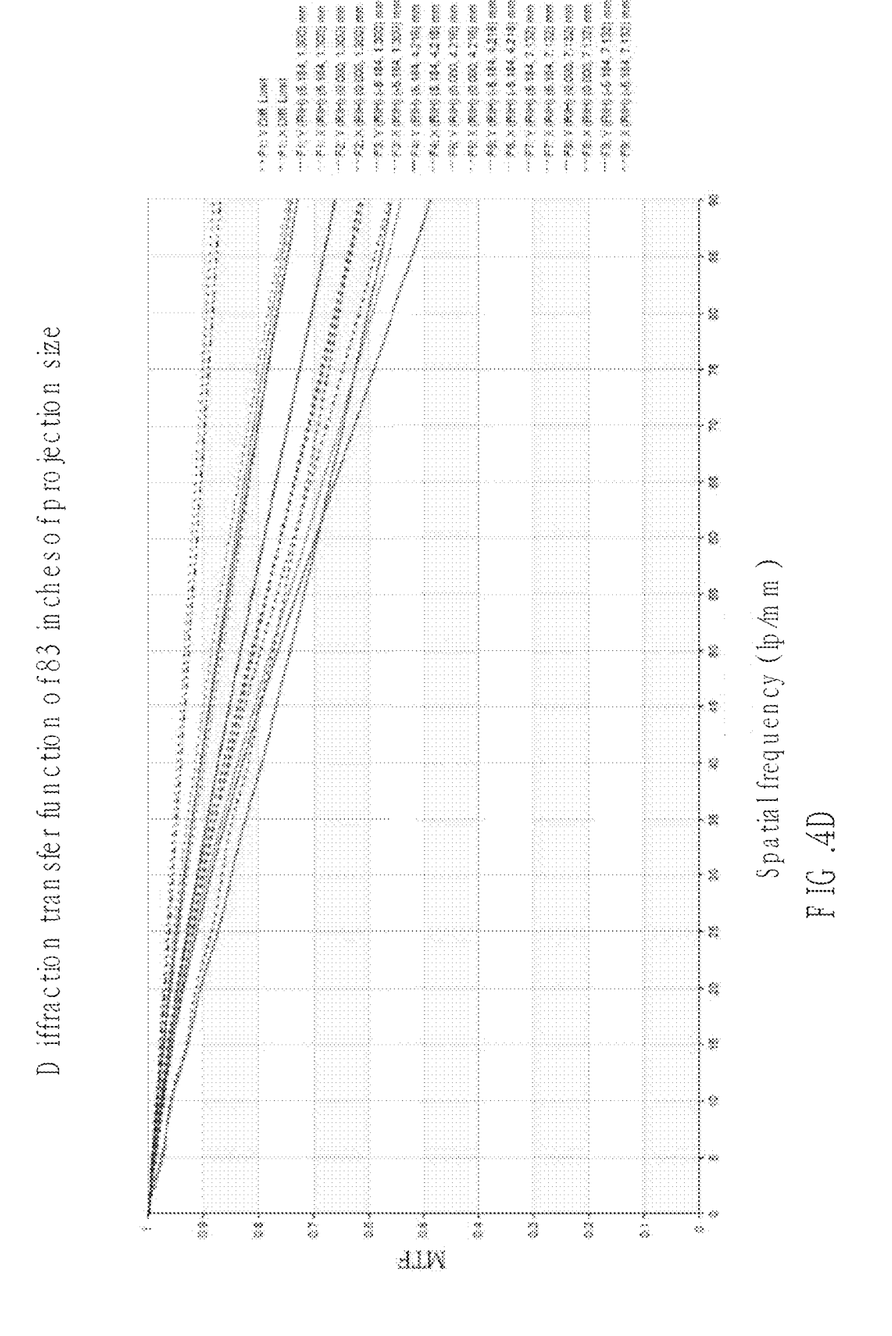

FIG. 4A illustrates different sample points F1~F9 on the projection screen. FIGS. 4B to 4D respectively illustrate the wide angle lens modulation transfer function of the reflective wide-angle lens according to the embodiment for the projection sizes of 110 inches, 98 inches, and 83 inches, in which different curves correspond to the wide-angle lens modulation transfer function curves of the positions of F1~F9 on the screen respectively, wherein each position is subdivided into x-direction (sagittal) and y-direction (tangential).

Figure 5:
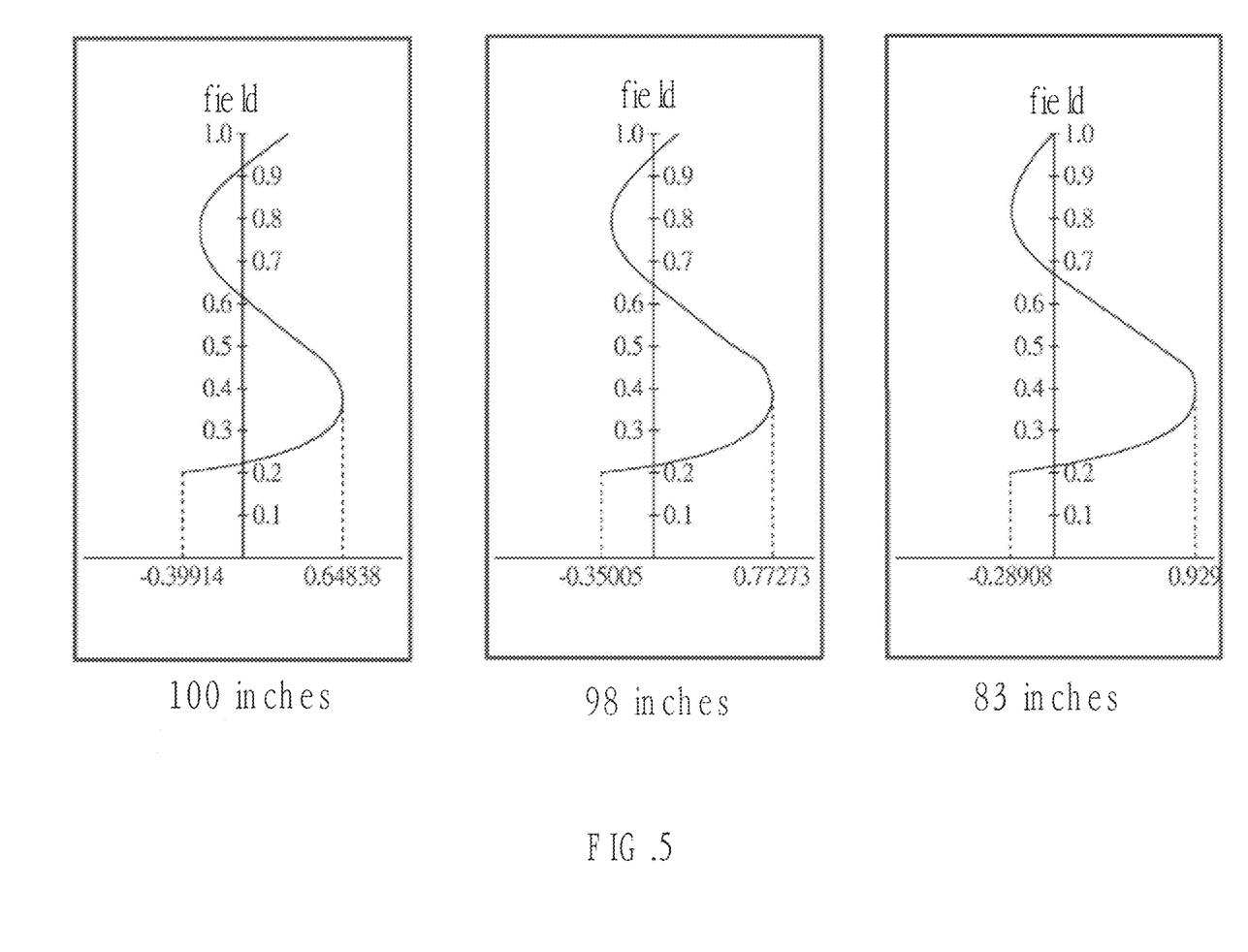
FIG. 5 is a distorted phase aberration diagram of the reflective wide-angle lens for different projection sizes.

FIG. 5 is a distorted phase aberration diagram (Distortion) of the reflective wide-angle lens for projecting sizes of 110 inches, 98 inches, and 83 inches according to this embodiment. As shown, the distortions of the reflective wide-angle lens of this creation are less than 1% over the entire field of view. It should be noted that the purpose of the distorted phase aberration diagram shown in FIG. 5 is merely exemplary, and the detailed data is contained in TABLE 6 below.

TABLE 6

| 110 inches | | 98 inches | | 83 inches | |
| --- | --- | --- | --- | --- | --- |
| Field | Distortion (%) | Field | Distortion (%) | Field | Distortion (%) |
| 0.2 | −0.39914 | 0.2 | −0.35005 | 0.2 | −0.2891 |
| 0.3 | 0.55477 | 0.3 | 0.6523 | 0.3 | 0.77393 |
| 0.4 | 0.64838 | 0.4 | 0.77273 | 0.4 | 0.929 |
| 0.5 | 0.4027 | 0.5 | 0.52795 | 0.5 | 0.68723 |
| 0.6 | 0.05944 | 0.6 | 0.15805 | 0.6 | 0.28633 |
| 0.7 | −0.22331 | 0.7 | −0.17172 | 0.7 | −0.0997 |
| 0.8 | −0.27243 | 0.8 | −0.28037 | 0.8 | −0.2805 |
| 0.9 | −0.06287 | 0.9 | −0.13741 | 0.9 | −0.2188 |
| 1 | 0.29988 | 1 | 0.15888 | 1 | −0.0043 |

It can be seen from the above embodiment that the large aperture (for example, FNO1.7) wide-angle lens of the present invention can achieve a projection ratio of 0.19, and the projection size can be used in a wide range of large sizes (for example, 110 to 83 inches).

In addition, the lens modulation transfer function of the present invention can reach about 0.5 or more at various positions of various projection sizes, wherein 98 inches is preferable, and the lens transfer function can reach about 0.6. Therefore, the wide-angle lens according to the present disclosure has sufficient margin in producing and assembling the lens to compensate for the tolerance during assembly, so that it is not necessary to separately adjust the internal lens during production, and the process is simple, thereby achieving the mass production of the wide-angle lens.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A reflective wide-angle lens used for projecting light from a display element, the reflective wide-angle lens comprising:
   a front lens group, wherein:
      the front lens group is disposed on an optical axis,
      the front lens group comprises:
         a first lens group, and
         a second lens group,
      the first lens group is configured to receive the light from the display element,
      the first lens group at least comprises a triplet cemented lens, an aspherical lens, and two spherical lenses,
      the triplet cemented lens comprises two external lenses and a central lens,
      the central lens is disposed between the two external lenses,
      the two external lenses negatively refract the light,
      the central lens positively refracts the light,
      the first lens group has a first focal length, and
      the second lens group is configured to receive the light from the display element and passing through the first lens group; and
   a rear lens group, wherein:
      the rear lens group comprises a curved reflective mirror for reflecting the light from the display element and passing through the first lens group and the second lens group,
      the curved reflective mirror has a second focal length,
      an absolute value of a ratio of the second focal length to the first focal length is greater than 0.7 and less than 1.3,
      a distance from an apex of a lens of the first lens group closest to the display element to an apex of a lens of the second lens group furthest from the display element along the optical axis is defined as a total length of the front lens group,
      a distance from the apex of the lens of the first lens group closest to the display element to a center point of the curved reflective mirror in a direction of the optical axis is defined as a total lens length, and
      a ratio of the total lens length to the total length of the front lens group is greater than 1.8 and less than 2.2.

2. The reflective wide-angle lens according to claim 1, wherein the optical axis of the front lens group is the same as an optical axis of the rear lens group.

3. The reflective wide-angle lens according to claim 1, wherein the second lens group at least comprises two aspherical lenses and two spherical lenses.

4. The reflective wide-angle lens according to claim 1, wherein the second lens group at least comprises two aspherical lenses and a doublet cemented lens.

5. The reflective wide-angle lens according to claim 1, wherein the curved reflective mirror is a concave optical axially symmetric aspheric reflective mirror.

6. The reflective wide-angle lens according to claim 1, wherein the second lens group is configured to move backward and forthward to adjust a focus of the reflective wide-angle lens.

* * * * *